United States Patent
Klein et al.

[11] Patent Number: 6,064,303
[45] Date of Patent: May 16, 2000

[54] PERSONAL COMPUTER-BASED HOME SECURITY SYSTEM

[75] Inventors: Dean Klein, Eagle; Greg Stevenson, Boise, both of Id.

[73] Assignee: Micron Electronics, Inc., Nampa, Id.

[21] Appl. No.: 08/978,246

[22] Filed: Nov. 25, 1997

[51] Int. Cl.[7] .................................................. G08B 29/00

[52] U.S. Cl. ............... 340/506; 340/825.06; 340/825.36; 700/17; 704/274; 704/275; 345/168

[58] Field of Search ................................. 340/506, 825.06, 340/825.36; 704/273, 274, 275; 700/17; 708/139; 345/168

[56] References Cited

U.S. PATENT DOCUMENTS

5,400,246  3/1995  Wilson ........................... 340/825.36 X

*Primary Examiner*—Daryl Pope
*Attorney, Agent, or Firm*—Dorsey & Whitney LLP

[57] ABSTRACT

A PC-based home security system for monitoring the environment surrounding a PC in order to detect suspicious or uncharacteristic events. The PC-based home security system first monitors the environment, listening and watching for a threshold event. When a threshold event is detected, the PC-based home security system then conducts close surveillance of the environment in order to detect and characterize additional events. When the accumulated detected events exceed some threshold value, the PC-based home security system determines that a suspicious or uncharacteristic set of events has occurred, diagnoses those events, and takes a remedial action appropriate to the diagnosed set of suspicious circumstances.

61 Claims, 5 Drawing Sheets

SOUND

| EVENT | $t_{start}$ | $t_{end}$ | SEVERITY |
|---|---|---|---|
| 1 | 0 | 2 | 50 |
| 2 | 3 | 3.5 | 5 |
| 2 | 4 | 4.5 | 10 |
| 2 | 5 | 5.5 | 20 |
| 2 | 6 | 6.5 | 30 |
| 4 | 10 | 10.25 | 59 |
| ⋮ | ⋮ | ⋮ | ⋮ |

VIDEO

| EVENT | $t_{start}$ | $t_{end}$ | SEVERITY |
|---|---|---|---|
| 103 | 10 | 10.1 | 80 |
| ⋮ | ⋮ | ⋮ | ⋮ |

| DIAGNOSIS KEY | EVENTS |
|---|---|
| 1 | (1 OR 3) + M2 +(103 + 4) |
| 1 | (1 OR 3) + 101 |
| 2 | 102 |
| 3 | 1 |
| ⋮ | ⋮ |

Fig. 6

| DIAGNOSIS | KEY | TELEPHONE # | TYPE OF RECEIVER | MESSAGE |
|---|---|---|---|---|
| intruder | 1 | 392-4566 | voice | intrdr.wav |
| intruder | 1 | 461-8832 | fax | intrdr.doc |
| fire | 2 | 392-4000 | voice | fire.wav |
| vandalism | 3 | 392-4566 | voice | vandal.wav |
| vandalism | 3 | 461-8832 | fax | vandal.doc |
| teenage party | 4 | 321-8741 | modem | party.doc |
| ⋮ | ⋮ | ⋮ | ⋮ | ⋮ |

PERSONAL COMPUTER-BASED HOME SECURITY SYSTEM

TECHNICAL FIELD

This invention relates generally to home security systems and, in particular, to a personal computer-based home security system.

BACKGROUND OF THE INVENTION

Along with the rapid increase in processor speeds, memory size, and disk capacity in commonly available personal computers ("PCs"), the types and capabilities of standard input/output devices included in PCs have also begun to increase. In particular, PCs are currently routinely sold with a microphone and audio speakers along with the software and hardware components required to capture sound through the microphone and store the captured sound in data files on a magnetic disk. The PC user can purchase any number of software packages that allow the user to edit and play back the recorded sound through the audio speakers.

Electronic home security systems have been sold in the consumer market for many years. These home security systems normally include a variety of sensors, including photo detectors, motion detectors, and sound detectors, along with a microprocessor and driving programs that coordinate monitoring of the sensors that analyze data collected through monitoring of sensors to detect suspicious or uncharacteristic events, and that can effect certain remedial actions in response to detected events. These home security systems are often expensive, and require extensive installation procedures, particularly of the sensing devices.

SUMMARY OF THE INVENTION

The present invention provides a personal computer-based home security system, implemented as a software program, that runs on commercially available personal computers. In one embodiment, the personal computer-based home security system monitors an environment to detect and remedy unusual circumstances that occur in the environment. This personal computer-based home security system includes a monitoring routine that detects threshold events that indicates a change in the environment. When such a change has been detected, the personal computer-based home security system launches a close surveillance routine. The close surveillance routine closely monitors the environment to detect, characterize, and record events that occur in the environment. When the close surveillance routine detects sufficient events to determine that a suspicious set of circumstances has occurred in the environment, the personal computer-based home security system calls a remedy routine to diagnose the suspicious set of circumstances and initiate an appropriate remedial action consistent with the diagnosis.

DETAILED DESCRIPTION OF THE INVENTION

The present invention provides a PC-based home security system. In one embodiment, the PC-based home security system monitors the environment within a home to detect threshold events that may warrant closer examination. Following detection of a threshold event, the home security system then conducts a close surveillance of the home environment to detect suspicious or uncharacteristic circumstances, diagnoses those circumstances where possible, and initiates remedial action in the case that the diagnosed circumstances are of a serious nature. The embodiment may be implemented on standard, commonly available PCs that already include a microphone or that include both a microphone and a video camera. The PC-based home security system of some embodiment of the present invention is thus an easy-to-install and inexpensive software program that runs on commonly available PCs.

Figure 1:
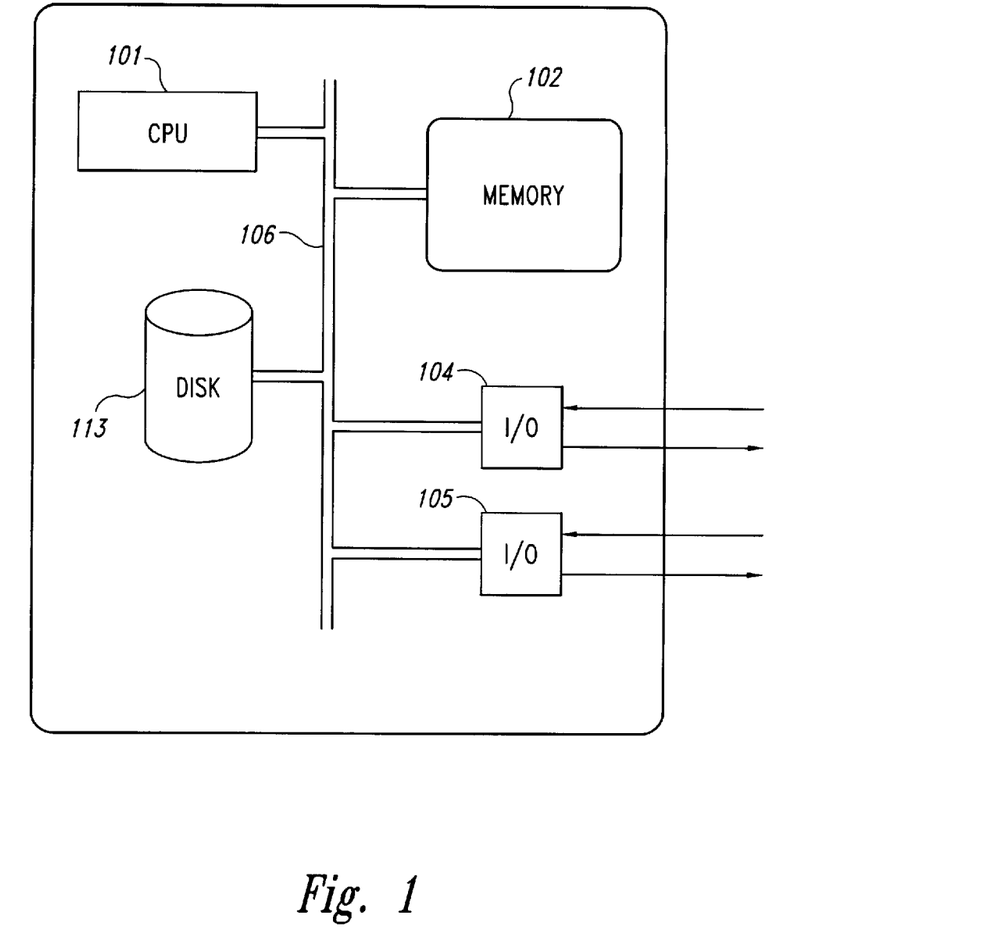
FIG. 1 displays a simple schematic drawing of the internal components of a PC.

FIG. 1 displays a simple schematic drawing of the internal components of a PC. A PC includes a CPU 101, memory 102, a hard disk nonvolatile data storage device 103, various input/output devices 104–105, and one or more internal buses 106 that enable the various components to exchange data. Software programs are executed by the CPU, which fetches and executes the instructions of the program stored in memory 102. Permanent copies of the software programs are stored on the hard disk 103 and transferred to memory prior to execution. Each separate hardware controller 104 and 105 interfaces with one of a variety of different types of input/output devices, including keyboard, mouse, a microphone, a video camera, audio speaker, a printer, a fax, and a modem. Under the direction of executing software programs, the input/output device controllers enable transfer of data from input devices over the internal bus to memory and transfer of data over the internal bus from memory to output devices. A software program can direct, for example, a microphone to record the sound environment of a PC and can direct storage of the data representing the recorded sound into memory and into permanent data files stored on the hard disk.

Figure 2:
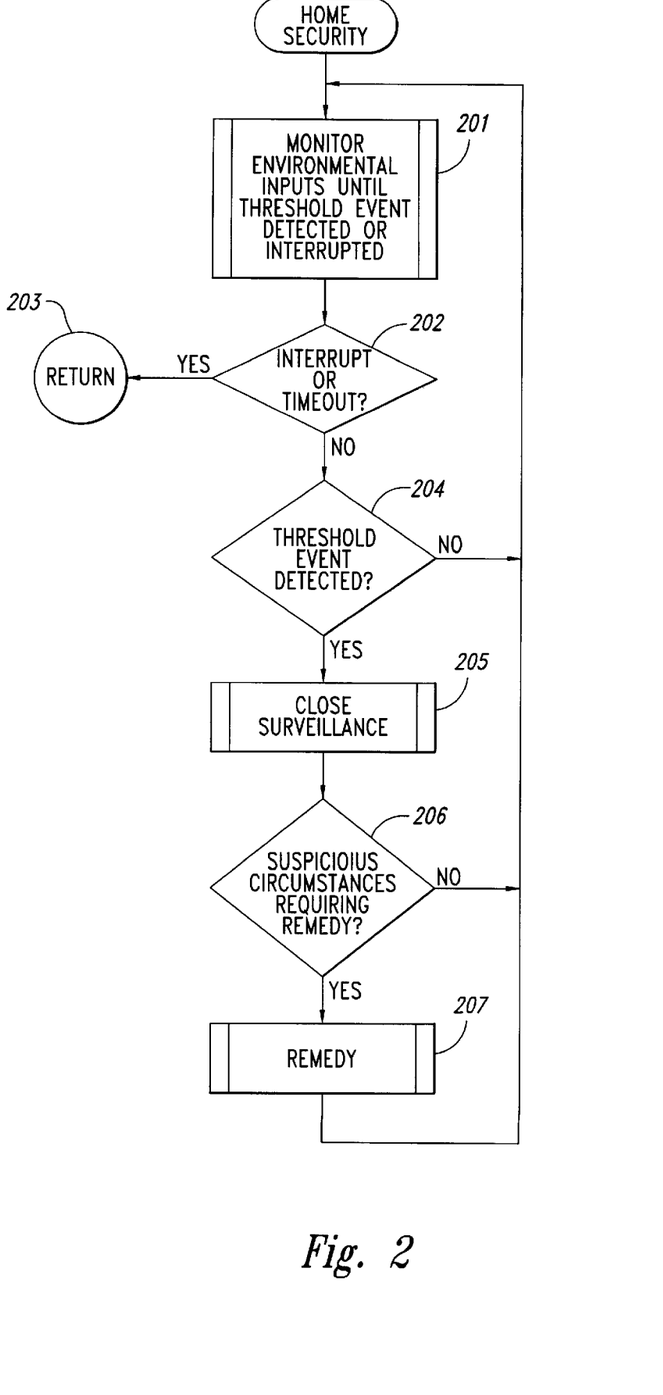
FIG. 2 displays a flow control diagram for a PC-based home security system.

FIG. 2 displays a flow control diagram for one embodiment of the PC-based home security system. The PC-based home security system of FIG. 2 comprises one or more software programs instantiated as one or more corresponding executing processes within the PC. When the home security system is started, it begins to monitor, in step 201, input data from the environmental input devices attached to the PC, including a microphone or a microphone and a video camera. The PC-based home security system continues to monitor this input data in step 201 until it detects a threshold event or, alternatively, until it times out or is interrupted.

A threshold event is generally a discontinuity in the input data stream that rises above a certain threshold value. For example, for data input from a microphone, a threshold event might be an abrupt increase in the detected amplitude at a particular sound frequency or an increase in the average sound level. For a video camera, a threshold event might be the detection of movement against the normal background, a marked decrease in contrast, or a rapid change in overall brightness.

When the monitoring step either stops or is interrupted, the home security system determines, in step 202, whether the termination of monitoring represents an intentional interrupt command generated by the user or represents a time-out either based on the length of the monitoring period or based on the time of day. If such an expected or intentional termination is detected in step 202, the home security system program returns in step 203. If the monitoring step has not been intentionally terminated, then the home security system determines in step 204 whether the monitoring step has detected a threshold event. If no threshold event has been detected, control returns to the monitoring step 201. If, however, a threshold event has been detected, then control flows to the close surveillance step 205.

In the close surveillance step, the home security system closely monitors and records data input from the environmental input devices. The home security system continues to closely monitor this data either until the home security system determines that a suspicious set of circumstances that require remedial action has occurred, or until no further threshold events have been detected for a certain period of time. In step 206, the home security system determines, following the close surveillance step 205, whether suspicious circumstances requiring remedial action have occurred. If not, control returns to the monitoring step 201. If, however, suspicious circumstances have been detected, then, in step 207, the home security system diagnoses those circumstances, if possible, and takes the appropriate remedial action.

In one embodiment of the invention, remedial action generally involves connecting via the voice enabled FAX/modem included in the PC to an outside telephone number and transferring over the connection one or more of a number of stored messages, depending on the nature of the receiving party and on the diagnosis of the suspicious circumstances. For example, if a fax machine is called following detection of unusual sounds, then the home security system may send a fax-based message. If, on the other hand, the home security system elects to call a police station in response to diagnosing the presence of an intruder, then the home security system may broadcast through the modem a voice message stored as a voice data file on the hard disk of the PC that informs the police of the address of the house and a warning that an intruder is present. The activities conducted by the home security system in steps 201, 205, and 207 will be discussed in greater detail below.

In the monitoring step 201, the home security system essentially listens and watches through the microphone and video camera for significant changes to the normal background environment within the home. Many different criteria may be used to detect these changes. For example, in the case of sound data obtained through the microphone, a sharp rise in the overall sound level within the home above some threshold sound level value might be interpreted by the security system as a threshold event. Similarly, in the case of the video camera input, a rapid change from darkness to lightness within the home or the detection of a large object moving within the field of the video camera over a certain period of time may be considered by the home security system to be a threshold event. These threshold events are not immediately perceived by the home security system to be suspicious or uncharacteristic. They simply trigger increased surveillance by the home security system for a certain period of time in order to detect and record a number of events. In step 201, the input data may be temporarily recorded in a circular buffer so that the home security system can append the recorded data just prior to the threshold event to data recorded subsequently in the close surveillance step 205 in order to have an entire record of the time period just before the threshold event up until close surveillance is discontinued.

A more sophisticated approach that involves adaptation to the normal background environment of the house can be employed. The home security system can monitor the environment at a particular location for a period of time in order to characterize the normal environment with respect to the time of day. Using this more sophisticated monitoring approach, the home security system can detect threshold events that represent changes in the expected background environment at a given time of day.

Figure 3:
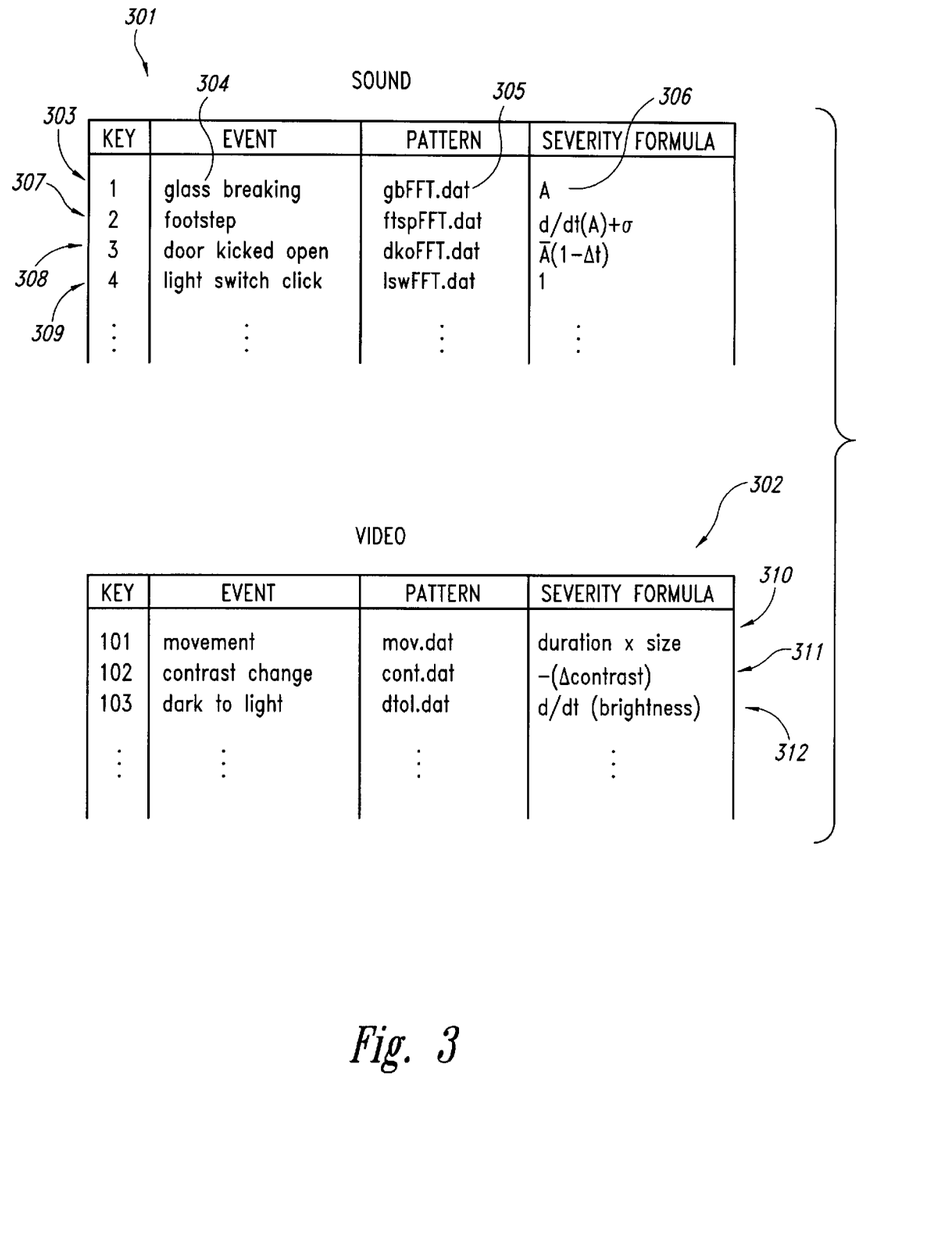
FIG. 3 displays example event tables.

It is preferable in the home security system to process the raw data input from the environmental input devices during close surveillance in order to enumerate, characterize, and time stamp various types of events. To that end, the home security system may include a database of different types of events along with corresponding data patterns that characterize those events. FIG. 3 displays two example event tables. These event tables include a table of sound events 301 and a table of video events 302. In the description of an event contained in each row of each table, a numeric key for the event, along with a character string representation of the event, is combined with a pattern characterizing the event and a severity formula by which the severity of the event can be calculated from the recorded data. For example, in the sound table 301, the first event has a key value 303 of "1", a character string representation 304 of "glass breaking," a data pattern stored in the file "gbFFT.dat" 305, and the severity formula "A" 306.

The key is a simple numeric designation of the event type. The data pattern stored in the file depends on the method by which the home security system processes input data in order to recognize patterns. In the case of sound data, for example, recorded data can be processed via a Fast Fourier Transform to provide the amplitudes at various discrete characteristic frequencies as a function of time. Thus, a recorded event can be processed using a Fast Fourier Transform to produce the pattern of amplitudes at characteristic frequencies for sample times within a time period, and that resulting pattern can be compared to stored patterns in the sound database in order to choose an event type that most closely corresponds to the recorded sound input.

The home security system may also store a severity formula for calculating from recorded input data a severity metric that corresponds to a perceived seriousness of the recorded event. For example, in the case of a glass breaking event, if it were possible for the microphone to detect the sound of glass breaking in a neighbor's house several hundred feet away from the house being monitored, then perhaps the severity formula would be a simple function of the overall amplitude or volume recorded during the glass breaking event, so that only events loud enough to have occurred within the house being monitored are designated as being serious. The example sound table 301 includes additional example events, including a footstep 307, the sound of a door being kicked open 308, and the sound of a light switch being clicked or turned on or off 309. In similar fashion, the video event table 302 includes a movement event 310, a contrast change event 311, and a dark-to-light event 312. Such tables would include a miscellaneous or catch-all type of event to represent events that cannot be characterized as belonging to one of the narrow, predetermined events such as glass breaking or footsteps. A default severity formula may be assigned to these unrecognized events that may be subsequently changed by a user of the security system. Several different types of unrecognized events may be included in event tables, and unrecognized events may be associated with generalized data patterns that would serve to distinguish one unrecognized event type from the other unrecognized event types.

Figure 4:
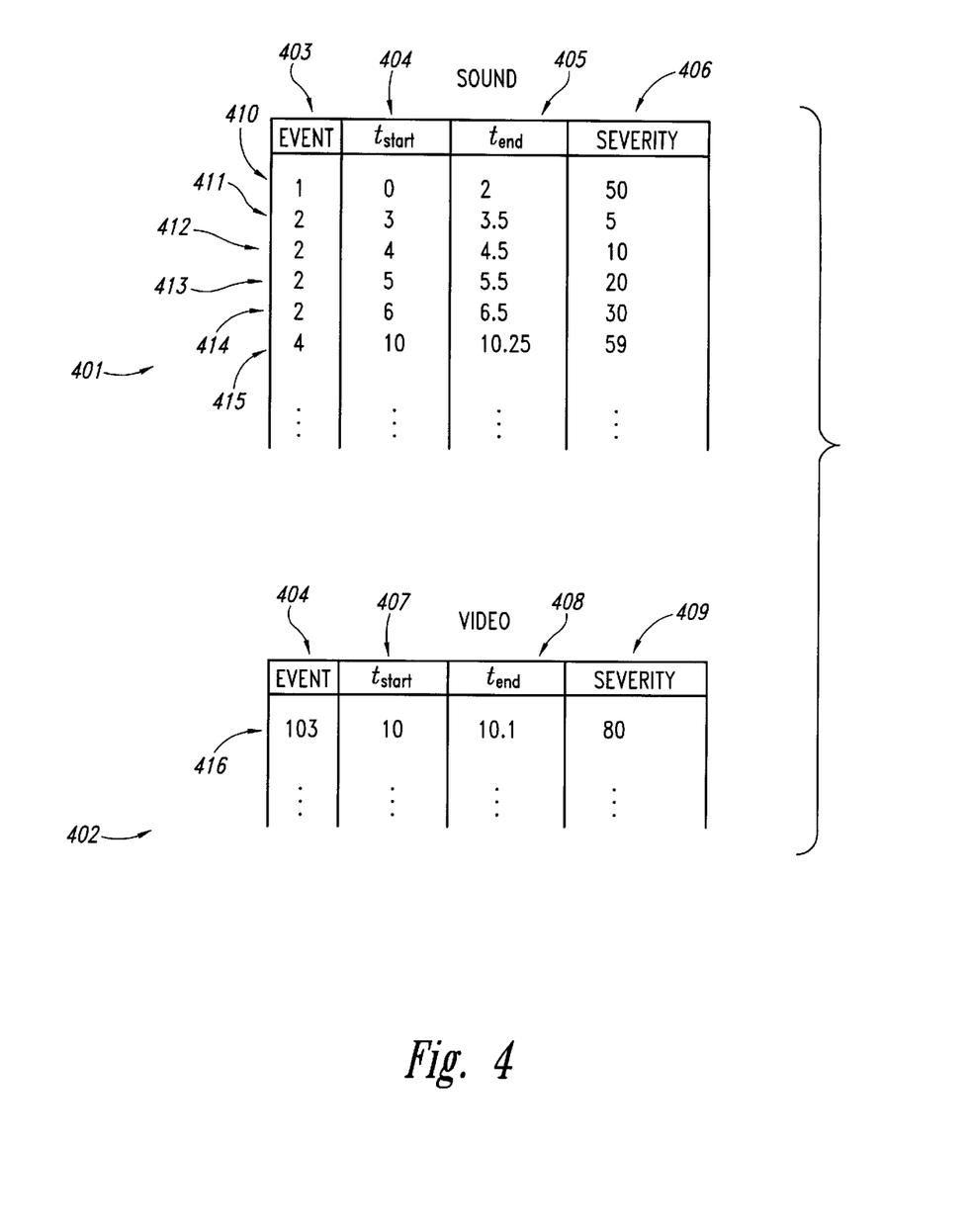
FIG. 4 displays example detected event tables.

In the close surveillance step 205, the home security system closely monitors and records the input data to detect events and to characterize and store the detected events into detected event tables. FIG. 4 displays example detected event tables. There is a sound event table 401 and a video event table 402. In both tables, events are classified according to a key for the event. The keys are defined in the sound and video event tables of FIG. 3. The classifications of events occur in columns 403 and columns 404 of the sound and video detected event tables. Along with each event detected by the home security system, the time that the event started and the time that the event ended, $t_{start}$ and $t_{end}$, are stored along with the calculated severity of the event in columns 404, 405, and 406 of the sound detected event table and in columns 407, 408, and 409 of the video detected event table. The recorded data may be stored in ".AVI" and ".WAV" files or in specially formatted files on either the hard disk of the PC or on secondary non-volatile storage devices like floppy drives or zip drives.

In the close surveillance step 205, the home security system may employ more than one executing process. A single process can, for example, closely monitor the input data and detect the starting point for events by detecting abrupt discontinuities in the input data. This process can then store records in the detected event tables that include only the starting time for the event. A second process can then process the detected event tables by looking up the starting times stored by the first process, using the stored patterns in the sound event and video event tables shown in FIG. 3 to characterize or pattern match the recorded events with known events and to calculate a severity for each recorded event. In the example shown in FIG. 4, the surveillance system has detected and characterized seven different types of events. At a starting time of 0, the home security system detected the sound of breaking glass and stored an entry 410 in the detected event table to correspond to that event. The home security system next detected the sound of four footsteps, stored in the detected event table in entries 411–414. Next, the home security system simultaneously detected the sound of a light switch being clicked on 415, as well as a dark-to-light event 416 detected from input video data and stored in the video detected event table.

Thus, the close surveillance step 205 both records the input data as well as processes the data in order to characterize discrete events that occur during close surveillance. The close surveillance step may continue for some set period of time or until either sufficient evidence has been collected to characterize the accumulated events as being suspicious and requiring remedial action or until no further events have been detected for a prolonged period of time.

The close surveillance step 205, like the monitoring step 201, will generally make a threshold determination based on the events detected and stored in the detected events tables shown in FIG. 4. The surveillance step can determine the threshold of suspicion by first computing a computed events metric and then comparing that computed events metric to a threshold value for the metric. When the computed events metric exceeds the threshold value, then the close surveillance step would indicate that a suspicious set of circumstances has occurred.

The following three equations show three different types of computed events metrics that can be employed by the close surveillance step:

$$m = N_s + N_v \qquad (1)$$

$$m = \sum_{i=1}^{i=N_s} S_i + \sum_{j=1}^{j=N_v} S_j \qquad (2)$$

$$m = \sum_{i=1}^{i=N_s} S_i + \sum_{j=1}^{j=N_v} S_j + \sum_{i=1}^{i=N_s} \sum_{j=1}^{j=N_v} \sigma_{ij} \frac{\Delta T_{surv} - \frac{1}{2}(\Delta T_e - \Delta T_{ij})}{\Delta T_{surv}} \qquad (3)$$

where:
 m=computed events metric;
 $N_s$=number of detected sound events;
 $N_v$=number of detected video events;
 $S_i$=severity of detected sound event i;
 $S_j$=severity of detected sound event j;
 $\sigma_{ij}$=correlation between type of sound event i and type of sound event j;
 $\Delta T_{surv}$=length of the surveillance period;
 $\Delta T_e$=expected time lapse between sound event and video event; and
 $\Delta T_{ij}$=actual time lapse between sound event and video event.

The first computed events metric is simply the sum of the number of sound events and video events detected. Thus, using this simple metric, if more sound and video events have been detected than some threshold value, the close surveillance system indicates that a suspicious set of circumstances has occurred. The second computed events metric formula is the combined sum of the sum of the severities of the events detected for the sound input device and the sum of the severities of the detected video events. Thus, if this second computed events metric is used, the close surveillance step will perceive suspicious circumstances to have occurred when the accumulated severities of detected events exceeds some threshold value. Finally, a more sophisticated computed events metric, shown in equation (3), might take into account the accumulated severities for the detected events along with an additional term that correlates the different sound events with the different video events that have been detected. For this formula, a table of event-type correlations would be maintained by the home security system along with expected time lapses between pairs of events. For example, the expected time lapse between the click of a light switch and a dark-to-light video event would be essentially 0. On the other hand, the expected time lapse between the sound of breaking glass and the detection of movement might be something on the order of 2 or 3 minutes, if not longer. Even more sophisticated computed events metrics can be employed.

If the close surveillance step determines that the computed events metric exceeds a certain threshold, and therefore perceives that a set of suspicious circumstances has occurred in the house, then the remedy step 207 is called by the home security system. The step may employ diagnoses and remedies of various sophistications and complexities. In the preferred embodiment, the remedy step attempts to correlate events detected by the close surveillance step to determine a general diagnosis of the suspicious circumstances, and then makes one or more telephone calls depending on the resulting diagnosis.

Figure 5:
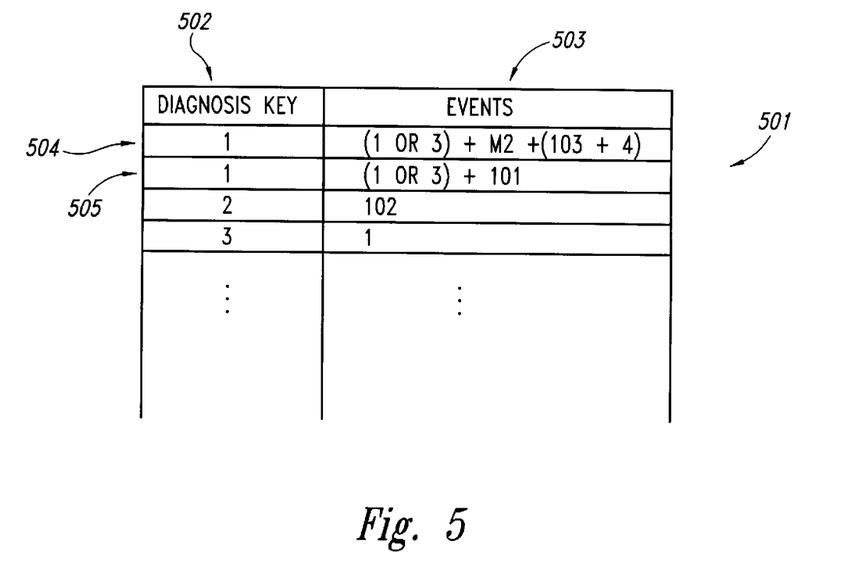
FIG. 5 displays an example diagnoses table.

FIG. 5 displays one embodiment of a stored diagnosis table that is used by the remedy step to diagnose the sequence of events that have occurred. There are a variety of different forms and underlying algorithms that can be employed for this diagnosis. In an example shown in FIG. 5, the diagnosis table 501 includes a diagnosis key 502 and an event sequence symbolic description 503 for each possible diagnosis. For example, the first entry indicates that a diagnosis with key 1 corresponds to detection of either an event of type 1 or type 3, where the event types are defined in the key column of the event tables of FIG. 3, followed by multiple events of type 2, followed by an event of type 103, followed by an event of type 4. With reference to the event tables of FIG. 3, this first diagnosis represents detection of breaking glass or the sound of a door being kicked in, followed by a number of footsteps, followed by detection of a dark-to-light event by the video camera along with detection of the sound of a light switch being clicked. This same type of diagnosis, type 1, may also result, as shown in entry 505 in table 501, from the detection of either the sound of breaking glass or the sound of a door being kicked in, followed by the detection of movement by the video camera. The diagnosis table also generally includes a miscellaneous or catch-all diagnosis type that describes circumstances that do not fit the more specific or narrowly defined diagnoses stored in the diagnosis table.

The remedy step thus compares the events logged in the detected event tables of FIG. 4 with the event sequences of various diagnoses listed in column 503 of diagnosis table 501 in order to match the accumulated events detected by the close surveillance step with one or more diagnoses for what has happened within the home. The remedy step then employs a remedy table to determine what action to take in response to the diagnosed circumstances.

Figure 6:
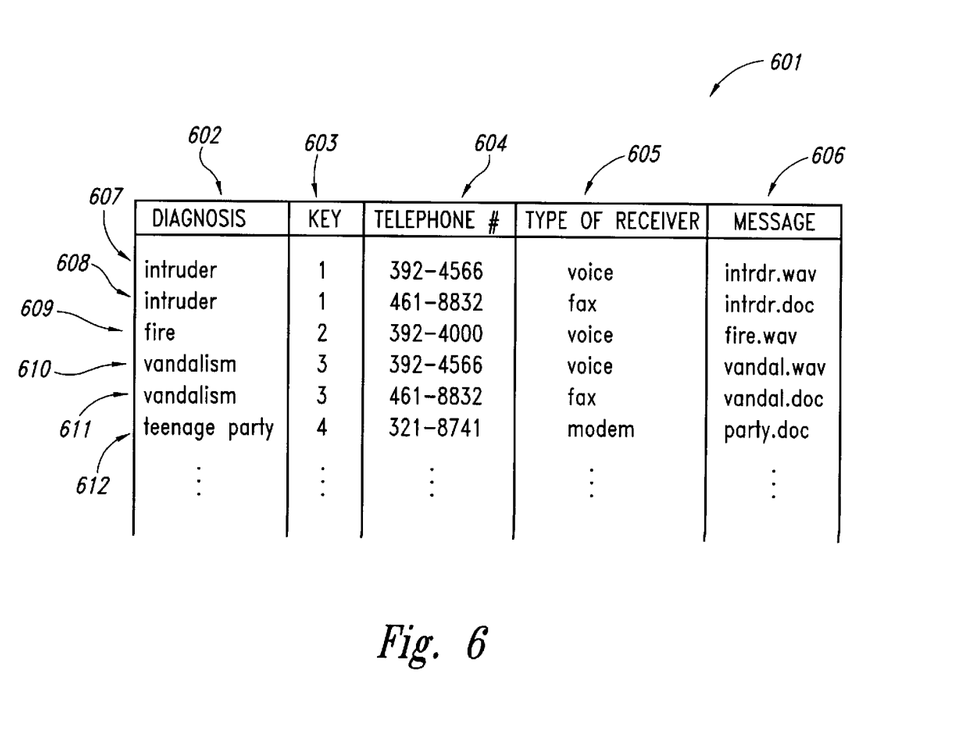
FIG. 6 displays an example remedy table.

FIG. 6 displays an example remedy table. The remedy table 601 includes columns for the character string representation of a diagnosis 602, for the key or type of the diagnosis 603 corresponding to one of the diagnosis keys stored in column 502 in table 501, for a telephone number 604, for a type of receiver 605, and for a message 606. Continuing with the example used above, the first row or entry of the remedy table 607 indicates that the diagnosis having a key value of 1 is described as "intruder," that the telephone number 392-4566 should be called by the home security system when an "intruder" diagnosis has been made by the home security system, that a voice-type message should be transmitted to this telephone number, and that the voice-type message is contained in the file "intrdr.wav." Thus, entry 607 in the diagnosis table indicates to the remedy step that if the sequence of events corresponding to a diagnosis type of "1" has been found in the detected event tables of FIG. 4, then the most likely diagnosis is that an intruder has entered the house, that the telephone number corresponding to the police station should be called, and that a previously recorded voice message that includes the address of the house and an indication that it is believed that an intruder has broken into the house will be played once either a human or an answering machine has answered the telephone. As shown in the remedy table of FIG. 6, a particular diagnosis may have more than one entry. For example, entry 608 specifies a different telephone number to be called in the case that an intruder has broken into the house and that a fax should be sent to the fax machine that answers the telephone at that number. Entries 609–612 contain the telephone numbers and messages to be transmitted to those telephone numbers in the event of detection by the home security system of different types of diagnosed circumstances, including a fire 609, vandalism 610 and 611, and the outbreak of a teenage party 612.

Although the present invention has been described in terms of the several embodiments, it is not intended that the invention be limited to these embodiments. Modification within the spirit of the invention will be apparent to those skilled in the art. For example, a wide variety of different computed events metrics might be used by the close surveillance step in order to make a threshold determination of suspiciousness. Such metrics might correlate events with the time of day that the events are detected. Different environmental input devices besides microphones and video cameras might be employed. Less expensive home security systems can be implemented on PCs having only a microphone, monitoring the environment entirely by means of audio data. Different types of databases with different data organizations can be used to store event characterizations, detected events, diagnoses, and remedial actions. Remedial actions other than phone calls can be undertaken, like, for instance, playing through the audio speakers a voice message to frighten intruders. The scope of the present invention is defined by the claims which follow.

We claim:

1. The personal computer-based home security system implemented as a software program that runs on commercially available personal computers that include a modem, a microphone, and a video camera, the personal computer-based home security system monitoring an environment to detect and remedy unusual circumstances that occur in the environment, the personal computer-based home security system comprising:

a monitoring component configured to sample data collected by the microphone and video camera to detect, without human assistance, threshold events that represent a change in the environment based on the sampled data;

a close surveillance component that is launched by the personal computer-based home security system following the detection of a threshold event by the monitoring component, the close surveillance component more frequently sampling data collected by the microphone and video camera in order to detect, characterize, and record events that represent differences between the sampled data and data normally collected from the environment; and a remedy component that is launched by the personal computer-based home security when the close surveillance component has detected sufficient events to initiate an appropriate remedial action.

2. The personal computer-based home security system of claim 1 wherein the monitoring component compares audio data input from the microphone and video data input from the video camera to expected background audio and video data for the environment and detects as a threshold event a discrepancy between the input data and expected background data greater than a threshold value.

3. The personal computer-based home security system of claim 2 wherein an increase in the amplitude of input audio data above the amplitude of the expected background audio data over a short time interval is a discrepancy between the input data and expected background data.

4. The personal computer-based home security system of claim 2 wherein detection of movement within in the input video data is a discrepancy between the input data and expected background data.

5. The personal computer-based home security system of claim 2 wherein an increase in the brightness of input video data above the brightness of the expected background video data over a short time interval is a discrepancy between the input data and expected background data.

6. The personal computer-based home security system of claim 2 wherein a decrease in the brightness of input video data above the brightness of the expected background video data over a short time interval is a discrepancy between the input data and expected background data.

7. The personal computer-based home security system of claim 2 wherein a decrease in the contrast of input video data above the contrast of the expected background video data over a short time interval is a discrepancy between the input data and expected background data.

8. The personal computer-based home security system of claim 2 wherein the input audio data and input video data are correlated with the time of day of input and compared to audio data and video data expected for that time of day.

9. The personal computer-based home security system of claim 2 wherein the input audio data and input video data are correlated with the time of day and the day of the week of input and compared to audio data and video data expected for that time of day and day of the week.

10. The personal computer-based home security system of claim 2 wherein the personal computer-based home security system is first trained by exposing it to the environment so that the personal computer-based home security system can detect and store a representation of the expected background input for the environment.

11. The personal computer-based home security system of claim 1, further including data patterns that define and categorize types of events.

12. The personal computer-based home security system of claim 11 wherein the close surveillance component monitors and records audio data input from the microphone and video data input from the video camera, detects differences in the input data from expected background, compares the detected differences with input patterns to determine the type of event that produced the differences, and computes a metric that describes a suspicion level corresponding to the detected events.

13. The personal computer-based home security system of claim 12 where the computed metric that describes a suspicion level is a sum of the number of different events detected by the close surveillance component.

14. The personal computer-based home security system of claim 12 including an event collection that contains information for each type of event that indicates to the close surveillance component how to compute a severity metric for that event, the information used by the close surveillance component to compute a severity metric in the indicated manner for each detected event.

15. The personal computer-based home security system of claim 12 where the computed metric that describes a suspicion level is a sum of the of the severity metrics computed for the different events detected by the close surveillance component.

16. The personal computer-based home security system of claim 12 where the computed metric that describes a suspicion level is a sum of the of the severity metrics computed for the different events detected by the close surveillance component along with a sum of correlations between pairs of events.

17. The personal computer-based home security system of claim 11 wherein the close surveillance component stores indications of detected events into detected event collections.

18. The personal computer-based home security system of claim 1, further including a diagnosis collection that contains indications of different types of diagnoses correlated with different event and event sequences.

19. The personal computer-based home security system of claim 18 wherein event sequences are lists of events ordered by time of occurrence.

20. The personal computer-based home security system of claim 18, further including a remedy collection that contains indications of remedial actions that should be initiated following determination of a particular diagnosis of events that have occurred in the environment and that have been detected by the close surveillance component.

21. The personal computer-based home security system of claim 20 wherein the remedy component compares the events that have been detected by the close surveillance component to the different event and event sequences stored in the diagnosis collection in order to match the detected events with a most likely diagnosis, selects actions from the remedy collection consistent with the most likely diagnosis, and initiates the selected actions.

22. The personal computer-based home security system of claim 1 wherein a remedial action directs the personal computer-based home security system to call a specific telephone number via the modem and send a specific message through the modem to a receiving party, the remedy collection storing an indication of the type of receiving party to expect for each telephone number, including a human, a fax machine, and another modem.

23. The personal computer-based home security system of claim 1, further including data patterns that defines and categorize types of events.

24. The personal computer-based home security system of claim 23 wherein the close surveillance component monitors and records audio data input from the microphone, detects differences in the input data from expected background, compares the detected differences with input patterns to determine the type of event that produced the differences, and computes a metric that describes a suspicion level corresponding to the detected events.

25. The personal computer-based home security system of claim 24 where the computed metric that describes a suspicion level is a sum of the number of different events detected by the close surveillance component.

26. The personal computer-based home security system of claim 24 including an event collection that contains information for each type of event that indicates to the close surveillance component how to compute a severity metric for that event, the information used by the close surveillance component to compute a severity metric in the indicated manner for each detected event.

27. The personal computer-based home security system of claim 24 where the computed metric that describes a suspicion level is a sum of the of the severity metrics computed for the different events detected by the close surveillance component.

28. The personal computer-based home security system of claim 24 where the computed metric that describes a suspicion level is a sum of the of the severity metrics computed for the different events detected by the close surveillance component along with a sum of correlations between pairs of events.

29. The personal computer-based home security system of claim 24 wherein the close surveillance component stores indications of detected events into a detected event collection.

30. The personal computer-based home security system implemented as a software program that runs on commercially available personal computers that include a modem, a microphone, the personal computer-based home security system monitoring an environment to detect and remedy unusual circumstances that occur in the environment, the personal computer-based home security comprising:

a monitoring component configured to sample data collected by the microphone to detect, without human assistance, threshold events that represent a change in the environment based on the sampled data;

a close surveillance component that is launched by the personal computer-based home security system following the detection of a threshold event by the monitoring component, the close surveillance component more frequently sampling data collected by the microphone in order to detect, characterize, and record events that represent differences between the sampled data and data normally collected from the environment; and a remedy component that is launched by the personal computer-based home security when the close surveillance component has detected sufficient events to initiate an appropriate remedial action.

31. The personal computer-based home security system of claim 30 wherein the monitoring component compares audio data input from the microphone to expected background audio data for the environment and detects as a threshold event a discrepancy between the input audio data and expected background audio data greater than a threshold value.

32. The personal computer-based home security system of claim 30 wherein an increase in the amplitude of input audio data above the amplitude of the expected background audio data over a short time interval is a discrepancy between the input data and expected background data.

33. The personal computer-based home security system of claim 30 wherein the input audio data is correlated with the time of day of input and compared to audio data expected for that time of day.

34. The personal computer-based home security system of claim 30 wherein the input audio data is correlated with the time of day and the day of the week of input and compared to audio data expected for that time of day and day of the week.

35. The personal computer-based home security system of claim 30 wherein the personal computer-based home security system is first trained by exposing it to the environment so that the personal computer-based home security system can detect and store a representation of the expected background input for the environment.

36. The personal computer-based home security system of claim 30, further including a diagnosis collection that contains indications of different types of diagnoses correlated with different event and event sequences.

37. The personal computer-based home security system of claim 36 wherein event sequences are lists of events ordered by time of occurrence.

38. The personal computer-based home security system of claim 36, further including a remedy collection that contains indications of remedial actions that should be initiated following determination of a particular diagnosis of events that have occurred in the environment and that have been detected by the close surveillance component.

39. The personal computer-based home security system of claim 38 wherein the remedy component compares the events that have been detected by the close surveillance component to the different event and event sequences stored in the diagnosis collection in order to match the detected events with a most likely diagnosis, selects actions from the remedy collection consistent with the most likely diagnosis, and initiates the selected actions.

40. The personal computer-based home security system of claim 30 wherein a remedial action directs the personal computer-based home security system to call a specific telephone number via the modem and send a specific message through the modem to a receiving party, the remedy collection storing an indication of the type of receiving party to expect for each telephone number, including a human, a fax machine, and another modem.

41. A personal computer-based home security implemented as a software program that runs on commercially available personal computers that include a modem, and video camera, the personal computer-based home security system monitoring an environment to detect and remedy unusual circumstances that occur in the environment, the personal computer-based home security system comprising:

a monitoring component configured to sample data collected by the microphone to detect, without human assistance, threshold events that represent a change in the environment based on the sampled data;

a close surveillance component that is launched by the personal computer-based home security system following the detection of a threshold event by the monitoring component, the close surveillance component more frequently sampling data collected by the microphone in order to detect, characterize, and record events that represent differences between the sampled data and data normally collected from the environment; and a remedy component that is launched by the personal computer-based home security when the close surveillance component has detected sufficient events to initiate an appropriate remedial action.

42. The personal computer-based home security system of claim 41 wherein the monitoring component compares video data input from the video camera to expected background video data for the environment and detects as a threshold event a discrepancy between the input video data and expected background video data greater than a threshold value.

43. The personal computer-based home security system of claim 41 wherein detection of movement within in the input video data is a discrepancy between the input data and expected background data.

44. The personal computer-based home security system of claim 42 wherein an increase in the brightness of input video data above the brightness of the expected background video data over a short time interval is a discrepancy between the input data and expected background data.

45. The personal computer-based home security system of claim 42 wherein a decrease in the brightness of input video data above the brightness of the expected background video data over a short time interval is a discrepancy between the input data and expected background data.

46. The personal computer-based home security system of claim 42 wherein a decrease in the contrast of input video data above the contrast of the expected background video data over a short time interval is a discrepancy between the input data and expected background data.

47. The personal computer-based home security system of claim 42 wherein the input video data is correlated with the time of day of input and compared to video data expected for that time of day.

48. The personal computer-based home security system of claim 42 wherein the input video data is correlated with the time of day and the day of the week of input and compared to video data expected for that time of day and day of the week.

49. The personal computer-based home security system of claim 42 wherein the personal computer-based home security system is first trained by exposing it to the environment so that the personal computer-based home security system can detect and store a representation of the expected background input for the environment.

50. The personal computer-based home security system of claim 41, further including data patterns that define and categorize types of events.

51. The personal computer-based home security system of claim 50 wherein the close surveillance component monitors and records video data input from the video camera, detects differences in the input data from expected background, compares the detected differences with input patterns to determine the type of event that produced the differences, and computes a metric that describes a suspicion level corresponding to the detected events.

52. The personal computer-based home security system of claim 51 where the computed metric that describes a suspicion level is a sum of the number of different events detected by the close surveillance component.

53. The personal computer-based home security system of claim 51 including an event collection that contains information for each type of event that indicates to the close surveillance component how to compute a severity metric for that event, the information used by the close surveillance component to compute a severity metric in the indicated manner for each detected event.

54. The personal computer-based home security system of claim 51 where the computed metric that describes a suspicion level is a sum of the of the severity metrics computed for the different events detected by the close surveillance component.

55. The personal computer-based home security system of claim 51 where the computed metric that describes a suspicion level is a sum of the of the severity metrics computed for the different events detected by the close surveillance component along with a sum of correlations between pairs of events.

56. The personal computer-based home security system of claim 50 wherein the close surveillance component stores indications of detected events into detected event collections.

57. The personal computer-based home security system of claim 56, further including a diagnosis collection that contains indications of different types of diagnoses correlated with different event and event sequences.

58. The personal computer-based home security system of claim 57 wherein event sequences are lists of events ordered by time of occurrence.

59. The personal computer-based home security system of claim 57, further including a remedy collection that contains indications of remedial actions that should be initiated following determination of a particular diagnosis of events that have occurred in the environment and that have been detected by the close surveillance component.

60. The personal computer-based home security system of claim 59 wherein the remedy component compares the events that have been detected by the close surveillance component to the different event and event sequences stored in the diagnosis collection in order to match the detected events with a most likely diagnosis, selects actions from the remedy collection consistent with the most likely diagnosis, and initiates the selected actions.

61. The personal computer-based home security system of claim 41 wherein a remedial action directs the personal computer-based home security system to call a specific telephone number via the modem and send a specific message through the modem to a receiving party, the remedy collection storing an indication of the type of receiving party to expect for each telephone number, including a human, a fax machine, and another modem.

\* \* \* \* \*

UNITED STATES PATENT AND TRADEMARK OFFICE
CERTIFICATE OF CORRECTION

PATENT NO.    :   6,064,303
DATED         :   May 16, 2000
INVENTOR(S)   :   Dean Klein et al.

It is certified that error appears in the above identified patent and that said Letters Patent is hereby corrected as shown below:

| | | |
|---|---|---|
| Column 8, Line 21 | "The" | -- A -- |
| Column 9, Line 51 | "is a sum of the of the" | -- is a sum of the -- |
| Column 9, Line 56 | "is a sum of the of the" | -- is a sum of the -- |
| Column 10, Line 27 | "defines" | -- define -- |
| Column 10, Line 50 | "is a sum of the of the" | -- is a sum of the -- |
| Column 10, Line 55 | "is a sum of the of the" | -- is a sum of the -- |
| Column 10, Line 63 | "The" | -- A -- |
| Column 10, Line 65, 66 | "include a modem, a microphone, the personal" | -- include a modem and a microphone, the personal -- |
| Column 12, Line 9, 10 | "include a modem, and video camera" | -- include a modem and a video camera -- |
| Column 12, Line 15 | "microphone" | -- video camera -- |
| Column 12, Line 22 | "microphone" | -- video camera -- |

UNITED STATES PATENT AND TRADEMARK OFFICE
CERTIFICATE OF CORRECTION

Page 2 of 2

PATENT NO. : 6,064,303
DATED : May 16, 2000
INVENTOR(S) : Dean Klein, et al.

It is certified that error appears in the above-identified patent and that said Letters Patent is hereby corrected as shown below:

| Column 12, Line 38 | "within in the input" | -- within the input -- |
| Column 13, Line 28 | "is a sum of the of the" | -- is a sum of the -- |

Signed and Sealed this

Twenty-second Day of May, 2001

*Attest:*

NICHOLAS P. GODICI

*Attesting Officer*       *Acting Director of the United States Patent and Trademark Office*